United States Patent
Reil et al.

(10) Patent No.: US 6,444,065 B1
(45) Date of Patent: Sep. 3, 2002

(54) METHOD OF MAKING ROTATABLE ROLLS OF PLASTIC MATERIAL

(75) Inventors: Frank Reil, Seeheim; Hermann Kleinegesse, Tremsbüttel, both of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/581,450

(22) PCT Filed: Dec. 9, 1998

(86) PCT No.: PCT/EP98/07995

§ 371 (c)(1),
(2), (4) Date: Jul. 3, 2000

(87) PCT Pub. No.: WO99/30913

PCT Pub. Date: Jun. 24, 1999

(30) Foreign Application Priority Data

Dec. 15, 1997 (DE) .......................... 197 55 725

(51) Int. Cl.$^7$ ................................. B32B 1/00
(52) U.S. Cl. .................. 156/86; 156/242; 156/245; 264/242; 264/255; 264/264; 264/328.7; 29/895; 492/49; 384/52; 384/587
(58) Field of Search ................. 384/586–587, 384/608, 19, 29, 44, 46, 50, 52, 127, 418, 548, 565, 569, 582; 156/84–86, 242, 245, 293, 244.11, 244.12, 244.22, 244.26, 244.27; 264/645, 241, 242, 250, 251, 259, 261, 262, 264, 319, 325, 328.1, 328.8, DIG. 68, 255, 328.7, 297.2; 492/60, 38, 40, 49, 56; 425/112, 129.1; 29/895, 895.2–895.22

(56) References Cited

U.S. PATENT DOCUMENTS

| | | | | |
|---|---|---|---|---|
| 3,646,652 A | * | 3/1972 | Heiligenthal et al. | 492/53 |
| 3,785,217 A | * | 1/1974 | Peura | 264/242 |
| 4,098,631 A | * | 7/1978 | Stryjewski | 156/221 |
| 6,059,095 A | * | 5/2000 | Tsuji | 193/35 F |

* cited by examiner

Primary Examiner—Michael W. Ball
Assistant Examiner—Jessica Rossi
(74) Attorney, Agent, or Firm—Connolly Bove Lodge & Hutz LLP

(57) ABSTRACT

Rotatable plastic rollers are produced by either injecting between a roller shaft and an outer running roller layer a thermoplastic material which, during cooling down, shrinks toward the roller shaft and away from the outer running roller layer on account of a contraction in volume or, in the multi-component injection-molding process, by first injecting the outer running roller layer and then injecting between the latter and the roller shaft a thermoplastic material which then likewise shrinks toward the roller shaft and away from the outer running roller layer. The process produces plastic rollers comprising an inner running roller layer (2), which is bonded solidly with the roller shaft (1), and an outer running roller layer (3), which can rotate freely with respect to said inner layer by means of a sliding gap (6). The roller shaft may optionally also be sheathed with a thermoplastic elastomer. This may take place in the same process during the multi-component injection molding.

3 Claims, 4 Drawing Sheets

METHOD OF MAKING ROTATABLE ROLLS OF PLASTIC MATERIAL

BACKGROUND OF THE INVENTION

Figure 1:
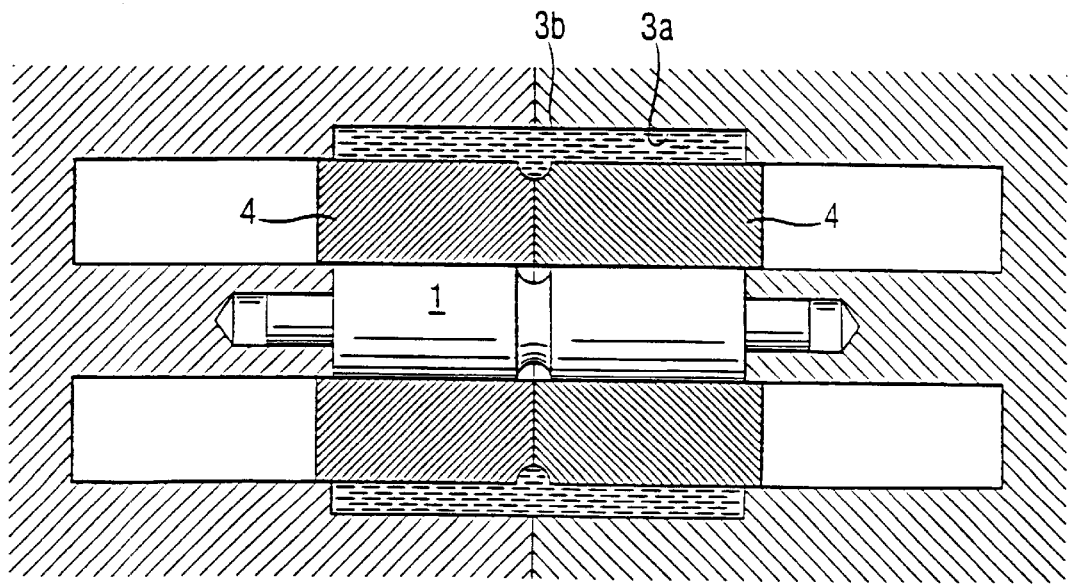

The invention relates to a process for producing rotatable plastic rollers comprising a spindle, an outer running roller layer and an inner running roller layer.

Plastic rollers of any type, in particular those with a metal shaft as the spindle, are customarily produced by mounting onto a spindle a separately produced plastic roller. In order that the plastic roller does not slip off the spindle after mounting, it must either have an undercut, for example an annular bead which grips in an annular depression on the spindle, or be secured by laterally fitted disks.

A major disadvantage of these processes is that the mounting of the plastic roller is time-consuming and often labor-intensive. What is more, the undercuts must be produced in such a way that the mounting of the plastic roller onto the spindle can still be accomplished. This generally leads to considerable backlash between the plastic roller and the spindle, which can have the effect of imprecise running, running noises or greater wear. If the plastic roller is secured by lateral disks, further mounting work is required and additional material costs arise.

It is also known to construct plastic rollers from a plurality of layers of different plastics. For example, in DE 93 19 307 U1 there is a description of castors for rollers which comprise a rim body and a hard outer shell as the tire, respectively of thermoplastic polymer, and also a soft, sound-absorbing intermediate layer. In this case, the intermediate layer is optionally formed by an injected elastomer, which becomes solidly bonded to the rim body and the tire by contact fusion in the surface regions of the latter, or by a polyurethane injection molding which is mechanically connected securely to the rim body and the tire, for example by undercuts or profiled grooves.

SUMMARY OF THE INVENTION

The object consequently was to provide a more cost-effective and environmentally friendly process for producing rotatable plastic rollers.

This object is achieved according to the invention by a process for producing rotatable plastic rollers comprising a roller shaft (=spindle of the plastic roller), an outer running roller layer and an inner running roller layer, in which process the inner running roller layer is produced from a thermoplastic material between the outer running roller layer and the roller shaft, the inner running roller layer bonding solidly with the roller shaft and a sliding gap forming between the inner running roller layer and the outer running roller layer.

In this process, use is made of the property of thermoplastic materials usually considered to be a disadvantage, that they undergo a greater or lesser contraction in volume (=shrinkage) during cooling down from the melt. According to the invention, this often undesired property is utilized by filling the cavity between the roller shaft and the outer running roller layer with the melt of a thermoplastic material in the production of a plastic roller. During cooling down, the thermoplastic material shrinks onto the roller shaft on account of the contraction in volume and is consequently solidly bonded to the latter. At the same time, the plastic shrinks away from the outer running roller layer, whereby a sliding gap is formed and the outer running roller layer becomes rotationally movable around the inner running roller layer. Further advantages of the process according to the invention consist in that neither a subsequent mounting step nor any securement of the plastic roller by additional components is required.

The process according to the invention can be carried out in an extremely simple way by initially placing the roller shaft and the outer running roller layer in an injection mold, referred to hereafter as mold for short, and injecting the thermoplastic material into the remaining cavity between the roller shaft and the outer running roller layer.

However, the process according to the invention is preferably carried out by the multi-component injection-molding process, in that only the roller shaft is initially placed in the mold and both the outer running roller layer and the inner running roller layer are produced by injection molding in the mold. For this purpose, a mold core, also referred to as a slide, is introduced into the mold around the roller shaft, so that there remains a cavity in the form of the outer running roller layer to be produced, into which a plastic is then injected. Once this plastic has cured sufficiently, the slide is removed, i.e. opened, and a thermoplastic material is injected into the cavity thus formed around the hollow shaft. During cooling down, this plastic then shrinks, as described, onto the roller shaft and away from the outer running roller layer.

In particular in the case of plastic rollers with a metal roller shaft, to dampen the running noises it is appropriate to sheath the roller shaft with a thermoplastic elastomer. This can take place on the one hand by a corresponding sheathing already having been applied to the roller shaft before it is encapsulated in the mold. On the other hand, however, it is also possible to choose the dimensions of the slide such that there remains between the slide, which in principle has the form of a cylinder jacket, and the roller shaft a cavity into which the thermoplastic elastomer can be injected. During cooling down, this plastic then shrinks onto the roller shaft and consequently provides a secure hold. After opening the slide, the thermoplastic material is then injected into the remaining cavity between the outer running roller layer and the sheathing comprising the thermoplastic elastomer. The thermoplastic material then shrinks onto the layer comprising the thermoplastic elastomer. The thermoplastic material and the thermoplastic elastomer are preferably chosen such that these two plastics enter into a chemical or physical bond with each other at their interface.

Rotatable plastic rollers which are constructed from any number of layers can be produced by the multi-component injection-molding process according to the invention. However, there must be at least two layers, the outer running roller layer and the inner running roller layer. During the production of plastic rollers by the process according to the invention, furthermore, it must be ensured that good adhesion is produced between the roller shaft and the inner running roller layer and that the materials from which the outer and inner running roller layers are made cannot enter into a bond with each other. The roller shaft and the outer running roller layer may generally consist of a plastics material, for example a thermosetting material or a reinforced or partially crystalline thermoplastic material, or of a metallic material. The roller shaft is preferably made of steel, while friction-modified plastics, for example friction-modified polyacetals, polyesters or polyamides, are suitable in particular for the outer running roller layer. Friction-modified plastics are understood here to mean those plastics which contain lubricants, i.e. additives for improving the sliding and dry-running properties. Suitable additives are generally known for all plastics.

In principle, all known thermoplastic materials are suitable as the thermoplastic material for the production of the inner running roller layer, for example polyacetals, e.g. polyoxymethylene (POM), polyester, e.g. polyethylene terephthalate (PET) or polybutylene terephthalate (PBT), polyamides (PA), in particular nylon 6, nylon 46 or nylon 66, polycarbonates (PC), polyvinyl chloride (PVC) or polyolefins, e.g. polyethylene (PE) or polypropylene (PP). During cooling down from the melt, these plastics should have a contraction in volume of 0.1 to 5%, preferably from 0.3 to 3.5% and particularly preferably from 0.5 to 2.5%. In addition, they may contain additives customary for thermoplastics, as well as fillers and reinforcing agents. Depending on the size of the plastic rollers to be produced, the thermoplastic material is optimized, for example by the addition of fillers or reinforcing agents or by the selection of a comonomer or a blend component, in such a way that the sliding gap formed by the shrinkage is neither too great nor too narrow.

Thermoplastic elastomers (TPEs) are known, for example under the designations TPE-O (polyolefin elastomers), TPE-E (polyether ester elastomers), TPE-U (polyurethane elastomers), TPE-A (polyether amide elastomers) and TPE-S (styrene elastomers). The TPE-Os include, for example, blends or copolymers of polypropylene and ethylene-propylene copolymers and the TPE-Ss include, inter alia, copolymers or blends of styrene and styrene-butadiene copolymers, if appropriate with additional olefin units, for example so-called SBS and SEBS grades. The thermoplastic elastomers may likewise contain customary additives. Instead of the TPEs, in principle the use of rubbers is also suitable, provided that they can be processed in a way corresponding to the invention.

On account of the good adhesion with respect to one another, the following combinations of thermoplastic elastomers or rubbers with thermoplastic materials are particularly suitable (for the inner running roller layer): styrene elastomers with PP, PA, PC, PET or PBT, polyolefin elastomers with PP or PA, polyamide elastomers with PA, polyurethane elastomers with PA, ABS, POM, PC, PET, PBT or PVC, polyester elastomers with PA, PET or PBT, nitrile rubber with PA, POM, PET or PBT and silicone rubber with PET or PBT, the rubbers preferably being additionally adhesion-modified.

In principle it is advantageous to combine various grades of plastic with one another in order to obtain good sliding properties. Preferred combinations are POM with PBT and POM with PA, POM being used with preference for the outer running roller layer and PBT or PA preferably being used for the inner running roller layer. However, other combinations may well be just as well suited.

In principle, the roller shaft may simply have just a smooth surface. However, to improve the adhesion between the roller shaft and the inner running roller layer or the elastomeric sheathing, it is advantageous to roughen the surface of the roller shaft or provide it with depressions and/or elevations which prevent any slipping of the plastic layer surrounding it. The depressions may be, for example, axial, radial or spiral notches or else regular or irregular local depressions, while the elevations may correspondingly take the form of axial, radial or spiral grooves or ridges or be represented by regular or irregular local elevations.

The axial securement between the outer running roller layer and the inner running roller layer is brought about by the shaping of the outer running roller layer. If the outer running roller layer is already initially placed in the mold, it may have, for example on the side facing the inner running roller layer, one or more radially arranged annular beads or ridges or a curved cross section. In any event, the subsequently injected inner running roller layer adapts itself to this shape and consequently provides an exact fit between the inner running roller layer and the outer running roller layer. If the outer running roller layer is first produced in the mold, it is possible to use two slides lying opposite each other, the end faces of which touch in the closed state. If the end faces are tapered at their outer radius, for example by a bevel or a similar shaping, an annular bead is produced during the injection molding of the outer running roller layer. The slides can also be tapered toward their end face on part of or the entire length that enters the mold, whereby the inner surface of the outer running roller layer is given a curved cross section. During the injection molding of the inner running roller layer, the latter in any event adapts itself in its form to the form of the outer running roller layer, whereby an exact fit is achieved between the inner running roller layer and the outer running roller layer at the same time as free rotatability.

The form of the plastic roller produced by the process according to the invention is in fact based on the desired design. The plastic roller may, for example, be cylindrically shaped. It is also readily possible, however, to shape the outer form of the outer running roller layer such that it is spherical or in any other desired way.

The plastic rollers produced according to the invention may generally be used as castors for items to be moved on rollers. Examples of such uses are furniture such as office chairs, computer desks, file carriages, serving carts, rolling containers, suitcases, shopping carts and baggage carts. The invention is explained in more detail below on the basis of exemplary embodiments 1 and 2 as well as FIGS. 1 to 8.

Exemplary embodiment 1: production of a plastic roller comprising a roller shaft, an outer running roller layer and an inner running roller layer.

DETAILED DESCRIPTION OF THE INVENTION

FIG. 1 shows a cross section through a cylindrical cavity in an injection mold, in which a roller shaft 1 has been initially placed in the axis of the plastic roller to be produced. Two slides 4, which are arranged opposite each other around the roller shaft 1 and take the form of cylinder jackets, and the outer end-face edges of which are concavely tapered, are closed, so that their end faces touch and an outer cavity 3a remains in the cavity where the outer running roller layer is to be formed. In a first process step, a friction-modified plastic 3b is injected into this outer cavity.

Figure 2:
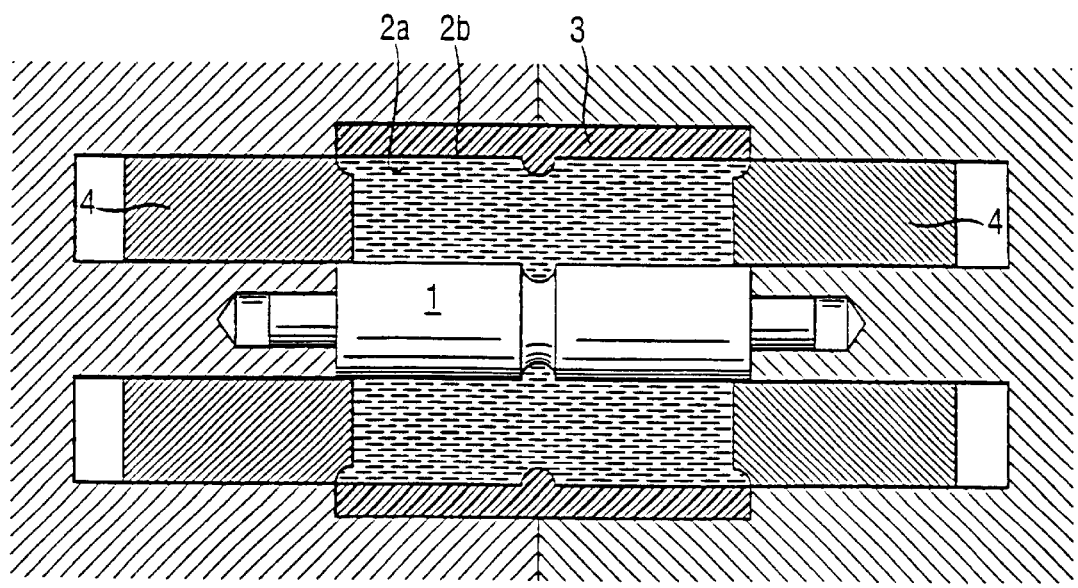

FIG. 2 shows the cavity with the cured outer running roller layer 3 and the opened slides 4. Between the roller shaft 1 and the outer running roller layer 3 there is an inner cavity 2a, where the inner running roller layer is to be formed. In a second process step, a thermoplastic material 2b is injected into this inner cavity.

Figure 3:
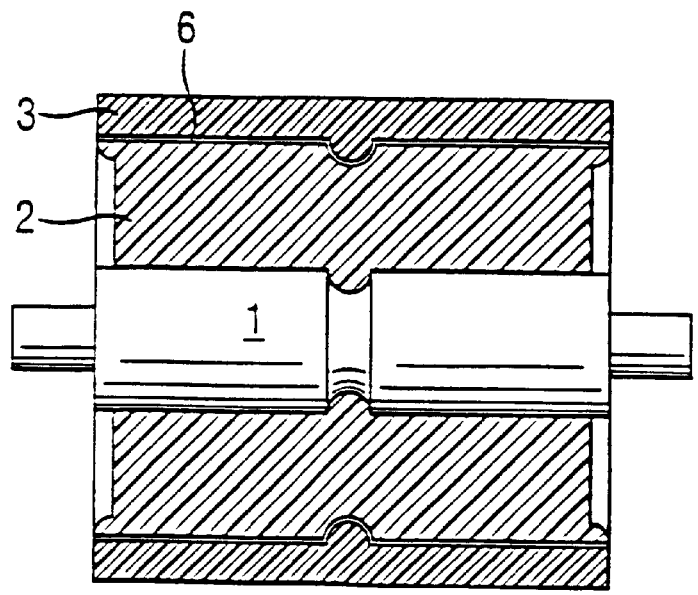

FIG. 3 shows a cross section through the injection molding removed from the mold, comprising a roller shaft 1, an inner running roller layer 2 and an outer running roller layer 3. There is a solid adhesive bond between the roller shaft 1 and the inner running roller layer 2. The outer running roller layer 3 is readily rotatable about the inner running roller layer 2, with a stable axial seating provided by a sliding gap 6.

Figure 4:
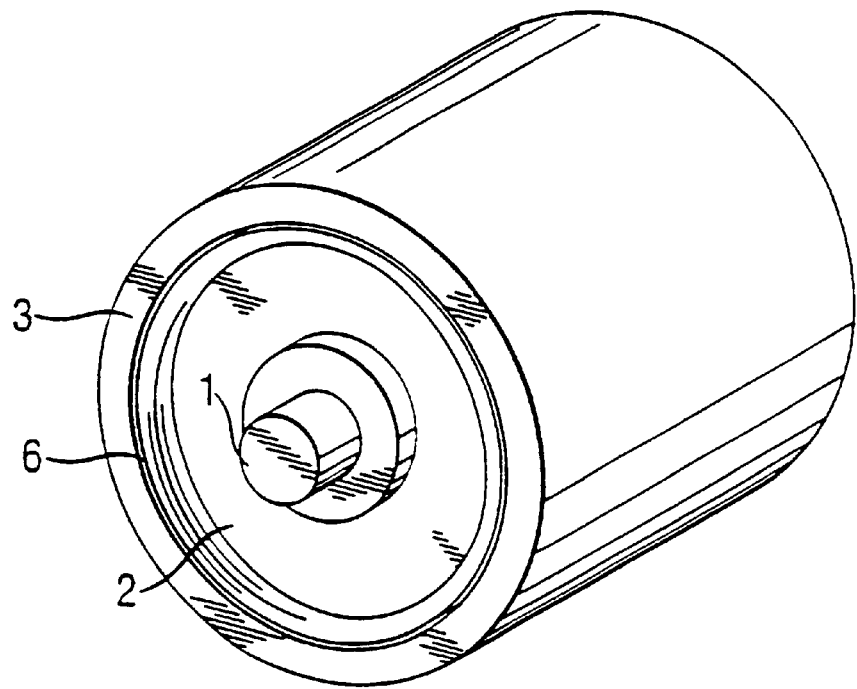

FIG. 4 shows the injection molding, i.e. the plastic roller, in a perspective view.

Exemplary embodiment 2: production of a plastic roller comprising an outer running roller layer, an inner running roller layer and a roller shaft with elastomeric sheathing.

Figure 5:
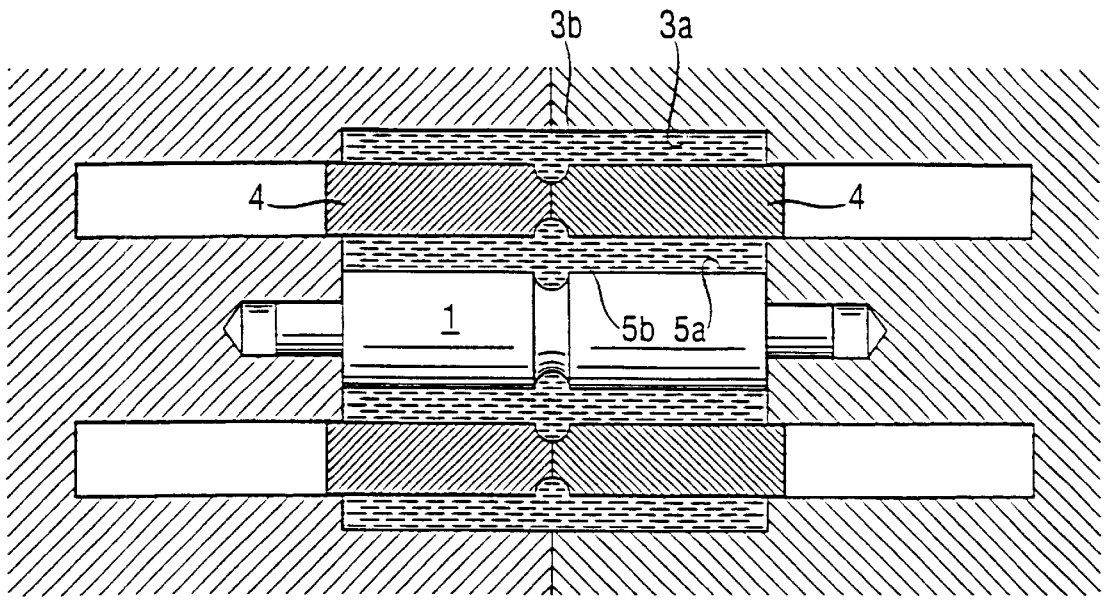

FIG. 5 shows a cross section through a cylindrical cavity in an injection mold, in which a roller shaft 1 has been initially placed in the axis of the plastic roller to be produced. Two slides 4, which are arranged opposite each other around the roller shaft 1 and take the form of cylinder jackets, and the inner and outer end-face edges of which are concavely tapered, are closed, so that their end faces touch and an outer cavity 3a remains in the mold where the outer running roller layer is to be formed and an inner cavity 5a remains between the slides 4 and the roller shaft 1 where the elastomeric sheathing of the roller shaft 1 is to be formed. In a first process step, a friction-modified plastic 3b is injected into the outer cavity 3a and a thermoplastic elastomer 5b is injected into the inner cavity 5a.

Figure 6:
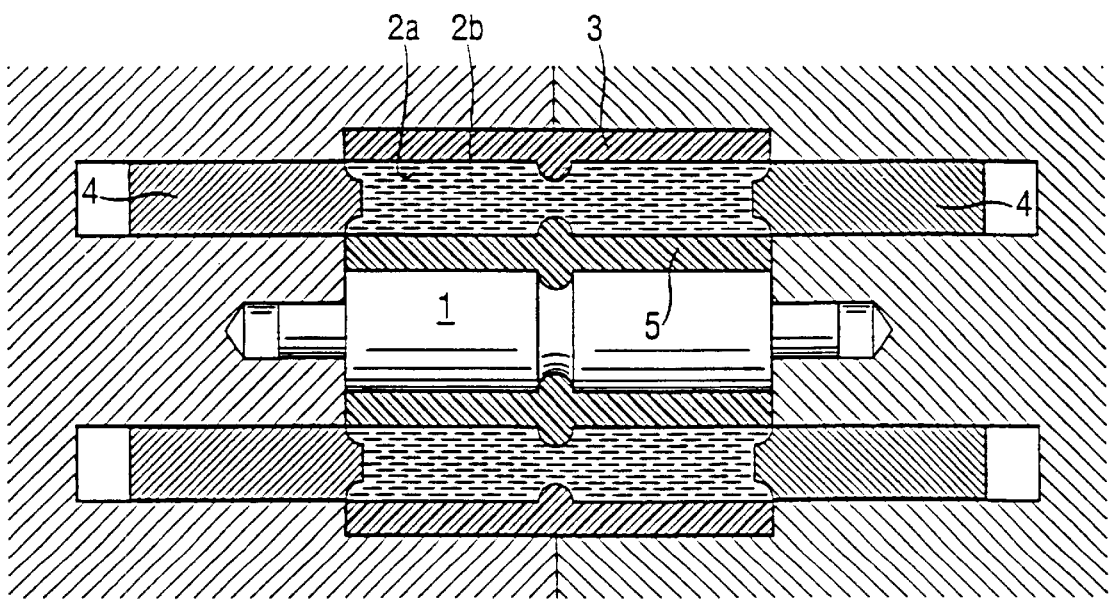

FIG. 6 shows the cavity with the solidified elastomeric sheathing 5, the cured outer running roller layer 3 and the opened slides 4. Between the elastomeric sheathing 5 and the outer running roller layer 3 there is a central cavity 2a, where the inner running roller layer is to be formed. In a further process step, a thermoplastic material 2b is injected into this central cavity.

Figure 7:
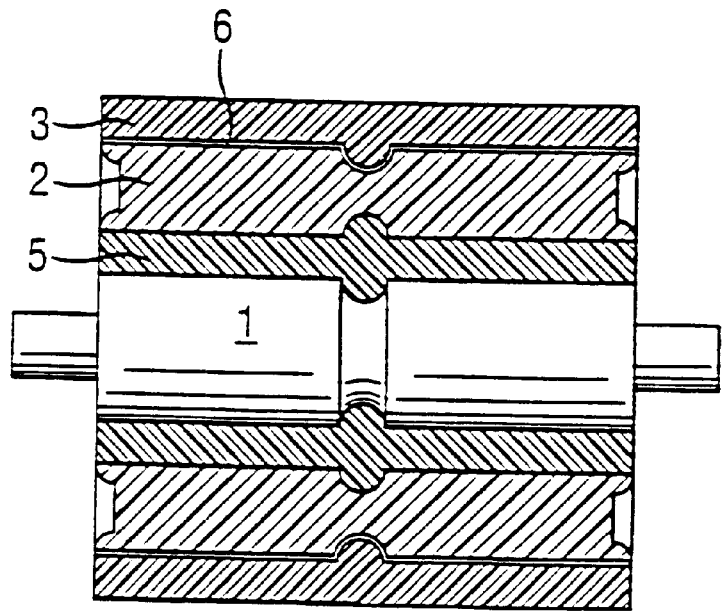

FIG. 7 shows a cross section through the injection molding removed from the mold, comprising a roller shaft 1, an elastomeric sheathing 5, an inner running roller layer 2 and an outer running roller layer 3. There is a solid adhesive bond between the roller shaft 1, the elastomeric sheathing 5 and the inner running roller layer 2. The outer running roller layer 3 is readily rotatable about the inner running roller layer 2, with a stable axial seating provided by a sliding gap 6.

Figure 8:
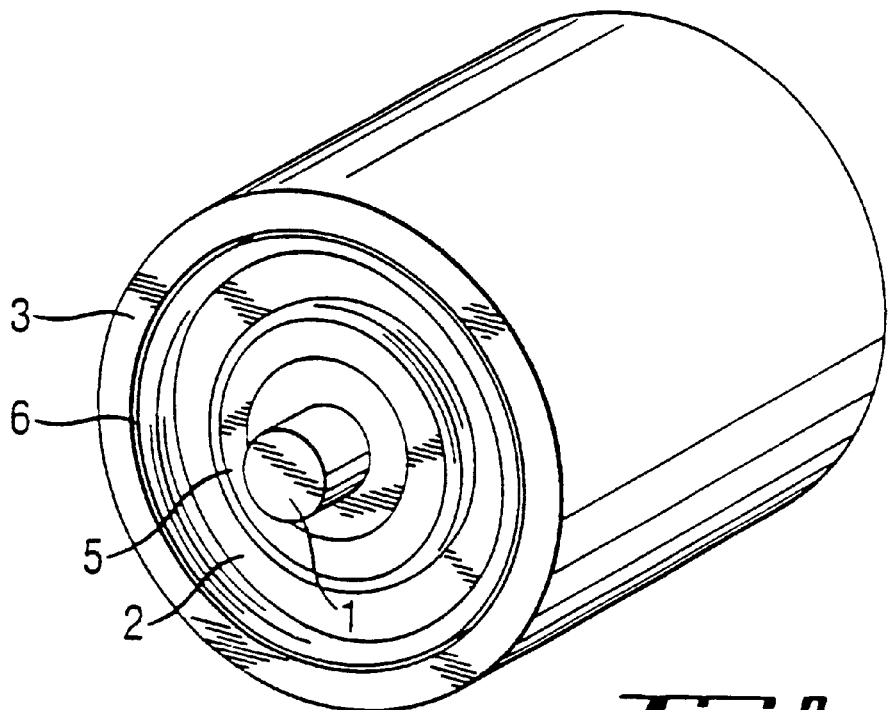

FIG. 8 shows the injection molding, i.e. plastic roller, in a perspective view.

What is claimed is:

1. A process for producing rotatable plastic rollers having a roller shaft, an outer running roller layer, and an inner running roller layer, the process steps comprising:
    producing the inner running roller layer by placing thermoplastic material between the outer running roller and the roller shaft;
    upon cooling, the thermoplastic material of the inner running roller layer shrinks and bonds to the shaft forming a gap between the inner running roller layer and the outer running roller layer so that the outer running roller layer is rotationally moveable around the inner running roller layer;
    both the inner running roller layer and the outer running roller layer being produced in one mold by a multi-component injection-molding by initially placing the roller shaft in the mold process;
    moving together two cylindrical slides arranged opposite each other around the roller shaft to thereby define an outer cavity in the mold into which thermoplastic material is injected to form the outer running roller layer; and
    subsequently moving the cylindrical slides apart to thereby define an inner cavity in the mold into which the thermoplastic material is injected to form the inner running roller layer.

2. A process according to claim 1 including the step of solidly bonding the inner running roller layer to the roller shaft.

3. A process as in claim 1 including the step of forming a mold space between the roller shaft and the cylindrical slides when moved together into which thermoplastic material is injected to form a sheathing between the roller shaft and the subsequently produced inner running roller layer.

* * * * *